(12) United States Patent
Wu

(10) Patent No.: US 12,716,474 B2
(45) Date of Patent: Aug. 25, 2026

(54) PLANETARY ROLLER SCREW

(71) Applicant: CHUAN HONG PRECISION TOOL MANUFACTURING CO., LTD., Kaohsiung City (TW)

(72) Inventor: San-Kuei Wu, Kaohsiung City (TW)

(73) Assignee: CHUAN HONG PRECISION TOOL MANUFACTURING CO., LTD., Kaohsiung City (TW)

( * ) Notice: Subject to any disclaimer, the term of this patent is extended or adjusted under 35 U.S.C. 154(b) by 0 days.

(21) Appl. No.: 19/098,526

(22) Filed: Apr. 2, 2025

(65) Prior Publication Data

US 2026/0117847 A1 Apr. 30, 2026

Related U.S. Application Data

(63) Continuation-in-part of application No. 19/017,851, filed on Jan. 13, 2025, now Pat. No. 12,535,124.

(30) Foreign Application Priority Data

Oct. 24, 2024 (TW) ................................ 113140778
Mar. 18, 2025 (CN) ......................... 202510321509.4
Mar. 24, 2025 (CN) ......................... 202510351293.6

(51) Int. Cl.
*F16H 25/22* (2006.01)
*F16H 25/24* (2006.01)

(52) U.S. Cl.
CPC ......... *F16H 25/2252* (2013.01); *F16H 25/24* (2013.01)

(58) Field of Classification Search
CPC .................................................. F16H 25/2252
See application file for complete search history.

(56) References Cited

U.S. PATENT DOCUMENTS 4,526,053 A * 7/1985 Carson ................ F16H 25/2252 74/501.5 R
4,884,466 A 12/1989 Duruisseau
(Continued)

FOREIGN PATENT DOCUMENTS

CN 107725708 A 2/2018
CN 109386581 A 2/2019
(Continued)

OTHER PUBLICATIONS

USPTO Machine Translation (retrieved from FIT database) of the Description of WO 2004/094870 A1, Sugitani, Nov. 4, 2004. (Year : 2026).*

*Primary Examiner* — Daniel D Yabut
(74) *Attorney, Agent, or Firm* — WPAT, PC

(57) ABSTRACT

A planetary roller screw adapted for solving insufficient structural strength of the conventional planetary roller screw while proceeding with precise motion control is disclosed. The planetary roller screw includes a main screw having a first external thread, a nut having an internal thread, and a planetary assembly having rollers. Each roller includes a second external thread. Helix directions of the first external thread and the internal thread of the nut are opposite, and helix directions of the internal thread of the nut and the second external thread are the same. A ratio of pitch circle diameters between two followers and a ratio of numbers of thread starts between the two followers are the same. A number of thread starts of the nut is not equal to a sum of a number of thread starts of the main screw and twice a number of thread starts of each roller.

10 Claims, 12 Drawing Sheets

(56) References Cited

U.S. PATENT DOCUMENTS

| | | | | |
|---|---|---|---|---|
| 7,736,256 | B2 | 6/2010 | Sugitani | |
| 2008/0110704 | A1 * | 5/2008 | Nakazeki | F16D 65/18 188/158 |
| 2020/0166107 | A1 * | 5/2020 | Wu | F16H 25/2252 |

FOREIGN PATENT DOCUMENTS

| | | | | | |
|---|---|---|---|---|---|
| CN | 212225912 | U | | 12/2020 | |
| CN | 114321309 | A | | 4/2022 | |
| CN | 115638221 | A | | 1/2023 | |
| CN | 118375705 | A | | 7/2024 | |
| EP | 1617103 | A1 | | 1/2006 | |
| EP | 3230625 | B1 | | 10/2020 | |
| JP | S5697659 | A | | 8/1981 | |
| JP | 2006117182 | A | | 5/2006 | |
| JP | 2007051684 | A | | 3/2007 | |
| JP | 2007057026 | A | | 3/2007 | |
| JP | 2007147070 | A | * | 6/2007 | F16H 25/2252 |
| JP | 2010156453 | A | | 7/2010 | |
| JP | 2023156010 | A | | 10/2023 | |
| JP | 2024020939 | A | | 2/2024 | |
| TW | M575840 | U | | 3/2019 | |
| TW | M666404 | U | | 2/2025 | |
| WO | WO-2004094870 | A1 | * | 11/2004 | F16H 25/2252 |
| WO | WO2010064508 | A1 | | 6/2010 | |

* cited by examiner

PLANETARY ROLLER SCREW

CROSS REFERENCE TO RELATED APPLICATION

The application claims the benefit of China applications serial No. 202510321509.4, filed on Mar. 18, 2025, and No. 202510351293.6, filed on Mar. 24, 2025, and is a continuation in part of the U.S. application Ser. No. 19/017,851, which claims the benefit of Taiwan application serial No. 113140778, filed on Oct. 24, 2024, and the entire contents of which are incorporated herein by reference.

BACKGROUND OF THE INVENTION

1. Field of the Invention

The present invention relates to a linear displacement technique and, more particularly, to a planetary roller screw.

2. Description of the Related Art

With the development of industrial technology, particularly the development of electric vehicles and humanoid robots, planetary screws are applied to linear displacement control and can be used to replace traditional hydraulic mechanisms due to characteristics of high load capacity, high positioning precision, and high speed motion, etc.

Please refer to FIG. 1 showing a conventional planetary roller screw 9. The planetary roller screw 9 includes plural rollers 93 disposed between a main screw 91 and a nut 92. The main screw 91 includes a first external thread 911. The nut 92 includes an internal thread 921. The plural rollers 93 are identical to each other and together forms a planetary assembly. Each of the plural rollers 93 has a second external thread 931. The plural rollers 93 rotates, with the main screw 91 being a driving member, such that the plural rollers 93 and the nut 92 moves as a whole along an axial direction of the main screw 91.

Based on the movement mechanism of the above conventional planetary roller screw 9, one of the main screw 91 and the nut 92, which is to be rotated, is defined as a driving member, whereas the other of the main screw 91 and the nut 92, which is to be displaced linearly, is defined as a follower. In a case that the main screw 91, the nut 92, and the plural rollers 93 have a larger pitch, the linear displacement of the follower is greater when the driving member rotates one round, thereby having a higher linear moving speed, and each component has a greater load/pressure withstanding capacity. In another case that the main screw 91, the nut 92, and the plural rollers 93 have a smaller pitch, the linear displacement of the follower is smaller when the driving member rotates one round, thereby having a lower linear moving speed to precisely control the displacement, but the load withstanding capacity of each component becomes smaller as the pitch being decreased. Therefore, in the applications on electric vehicles and humanoid robots, the conventional planetary roller screw cannot achieve both the precise displacement control and higher load withstanding capacity at the same time.

In addition, a design rule is proposed in another conventional art. A number of thread starts $T_{91}$ of the main screw 91 is limited to be: a number of thread starts $T_{93}$ of one of the plural rollers 93 times a pitch circle diameter $D_{91}$ of the main screw 91 divided by a pitch circle diameter $D_{93}$ of the roller 93. The relationship can be represented as $T_{91}=T_{93}(D_{91}/D_{93})$. At the same time, a number of thread starts $T_{92}$ of the nut 92 is limited to be: the number of thread starts $T_{91}$ of the main screw 91 plus twice the number of thread starts $T_{93}$ of the roller 93. The relationship can be represented as $T_{92}=T_{91}+2T_{93}$.

More specifically, in the requirements of the above design rule, since a pitch circle diameter $D_{92}$ of the nut 92 must be equal to the pitch circle diameter $D_{91}$ of the main screw 91 plus twice the pitch circle diameter $D_{93}$ of the roller 93, another relationship $D_{92}=D_{91}+2D_{93}$ can be obtained. Thus, conventional specifications can be derived: [a ratio of the pitch circle diameter $D_{91}$ of the main screw 91 to the pitch circle diameter $D_{93}$ of the roller 93] is equal to [a ratio of the number of thread starts $T_{91}$ of the main screw 91 to the number of thread starts $T_{93}$ of the roller 93], with the number of thread starts $T_{92}$ of the nut 92 being the number of thread starts $T_{91}$ of the main screw 91 plus twice the number of thread starts $T_{93}$ of the roller 93. The relationships can be represented as $D_{91}/D_{93}=T_{91}/T_{93}$ and $T_{92}=T_{91}+2T_{93}$.

Nevertheless, during the rotation of the driving member in the planetary roller screw 9 manufactured according to the above design rule, skid/slip or sliding motion is prone to happen among the main screw 91, the plural rollers 93 and the nut 92, and the expected rotation and output displacement cannot be effectively generated.

Thus, it is necessary to improve the conventional planetary roller screw.

SUMMARY OF THE INVENTION

To solve the above problem, it is an objective of the present invention to provide a planetary roller screw which may significantly increase the motion precision without reducing the load pressure.

It is another objective of the present invention to provide a planetary roller screw which may permit smooth motion control.

As used herein, the term "a", "an" or "one" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "engagement", "coupling", "assembly", "disposition", or similar terms is used to include separation of connected members without destroying the members after connection or inseparable connection of the members after connection. A person having ordinary skill in the art would be able to select according to desired demands in the material or assembly of the members to be connected.

A planetary roller screw according to the present invention includes a main screw, a nut, and a planetary assembly. The main screw includes an outer periphery having a first external thread extending along an axis of the main screw, with the axis of the main screw defining an axial direction. The nut includes a through-hole extending along the axial direction. The nut includes an inner periphery surrounding the through-hole. The inner periphery has an internal thread extending along the axial direction. All or a portion of the first external thread of the main screw is located in the through-hole of the nut. The planetary assembly includes plural rollers each extending along another axis parallel to the axis of the main screw. Each roller includes an outer periphery having a second external thread. At least a portion of each roller is located in the through-hole of the nut. The second external thread of each roller meshes with the first external thread of the main screw and the internal thread of the nut. A pitch of the first external thread of the main screw, a pitch of the internal thread of the nut, and a pitch of the second external thread of each roller are identical. A helix direction of the first external thread of the main screw is opposite to a helix direction of the internal thread of the nut, and the helix direction of the internal thread of the nut is the same as a helix direction of the second external thread of each roller. One of the main screw and the nut is a driving member, and the other two of the main screw, the nut and the planetary assembly that are not the driving member are defined as two followers. The planetary roller screw satisfies a rule of configuration. When the driving member rotates, the driving member displaces relative to the two followers in the axial direction, and no relative displacement occurs between the two followers in the axial direction. The rule of configuration requires that a ratio of pitch circle diameters between the two followers and a ratio of numbers of thread starts between the two followers to be the same, and the number of thread starts of the nut to be not equal to a sum of the number of thread starts of the main screw and twice the number of thread starts of each roller.

Thus, in the planetary roller screw according to the present invention, by the provision that the helix direction (of the internal thread) of the nut is the same as the helix direction (of the second external thread) of each roller and opposite to the helix direction (of the first external thread) of the main screw, and with the rules of configuration (the ratio of the pitch circle diameters between the two followers and the ratio of the numbers of thread starts between the two followers are the same, and the number of thread starts of the nut is not equal to the sum of the number of thread starts of the main screw and twice the number of thread starts of each roller), when a specific driving member rotates, no relative displacement occurs between the two followers in the axial direction, making the two followers displaces stably and smoothly relative to the driving member in the axial direction, and increasing the corresponding displacement decelerated ratio, to thereby achieve more precise displacement control. Particularly, by the motion relationship between the driving member and the two followers of the planetary roller screw according to the present invention, the planetary roller screw according to the present invention may replace hydraulic cylinders and may be used in various tool machines, brake devices, humanoid robots, etc. requiring precise control of linear motion.

In an example, in the rule of configuration, the nut is the driving member, the ratio of the pitch circle diameter of the main screw to the pitch circle diameter of each roller is identical to the ratio of the number of thread starts of the main screw to the number of thread starts of each roller. When the driving member rotates, the planetary assembly displaces relative to the nut in the axial direction, and no relative displacement occurs between the main screw and the planetary assembly in the axial direction. Thus, under this configuration, using the nut as the driving member and the main screw or the planetary assembly as the output, expected precise motion control can be achieved and structural strength can be increased.

In an example, in the rule of configuration, the main screw is the driving member, the ratio of the pitch circle diameter of the nut to the pitch circle diameter of each roller is identical to the ratio of the number of thread starts of the nut to the number of thread starts of each roller. When the driving member rotates, the planetary assembly displaces relative to the main screw in the axial direction, and no relative displacement occurs between the nut and the planetary assembly in the axial direction. Thus, under this configuration, using the main screw as the driving member and the nut or the planetary assembly as the output, expected precise motion control can be achieved and structural strength can be increased.

In an example, the planetary assembly further includes an annular frame portion disposed between the main screw and the nut. The annular frame portion includes plural receiving portions. A number of the plural receiving portions is not smaller than a number of the plural rollers, and each roller is received in a corresponding one of the plural receiving portions. Thus, by the disposition of the annular frame portion, the rollers of the planetary assembly may be stably and uniformly disposed around the main screw, which assures that force is uniformly distributed to the rollers, thereby increasing the smoothness while the planetary assembly is running.

In an example, the annular frame portion is an annular member. The plural receiving portions form plural through-holes each extending in a radial direction of the annular frame portion. When each roller is received in the corresponding one of the plural receiving portions, each roller and the corresponding receiving portion have a gap therebetween in a circumferential direction of the annular frame portion about an axis of the annular frame portion. Thus, by providing the spacing between each roller and the corresponding receiving portion, the rotational smoothness between each roller and the main screw and the rotational smoothness between each roller and the nut may be increased.

In an example, each of two ends of each roller in the axial direction includes a protruding portion. The planetary assembly further includes an annular frame portion disposed between the main screw and the nut. The annular frame portion includes two rings spaced from each other along the axial direction. Each of the two rings includes plural recessed portions spaced from each other in a circumferential direction about an axis of the annular frame portion. The plural recessed portions of one of the two rings are aligned with the plural recessed portions of another of the two rings. Each protruding portion of each roller is partially received in a respective one of the recessed portions. Thus, by the disposition of the annular frame portion, the rollers of the planetary assembly may be stably and uniformly disposed around the main screw, which assures that force is uniformly distributed to the rollers, thereby increasing the smoothness while the planetary assembly is running.

In an example, each protruding portion of each roller is provided with an elastic element. Each elastic element is disposed between and abuts against a respective one of the annular frame portions and a respective roller. Thus, each elastic element biases the respective roller to keep a certain tension in the axial direction to avoid the respective roller from deviating away from the axial direction during motion.

In an example, each of the first external thread of the main screw, the internal thread of the nut, and the second external thread of each roller includes an arcuate flank. Thus, the contact area between the second external thread of each roller and the first external thread of the main screw and the contact area between the second external thread of each roller and the internal thread of the nut may be reduced to reduce the corresponding friction, thereby reducing generation of noise and increasing the rotational smoothness.

In an example, the first external thread of the main screw further includes at least one toothed portion. The second external thread of each roller of the planetary assembly includes at least one toothed portion. When screwed rotating occurs between the first external thread of the main screw and the second external thread of each roller, rotating in mesh is generated between the at least one toothed portion of the first external thread of the main screw and the at least one toothed portion of the second external thread of each roller. This assures that while the planetary assembly is rotating, each roller revolves through pure rolling motion without unexpected friction caused by sliding motion, thereby increasing the smoothness while the whole planetary roller screw is running.

In an example, the internal thread of the nut includes at least one toothed portion. The second external thread of each roller of the planetary assembly includes at least one toothed portion. When screwed rotating occurs between the internal thread of the nut and the second external thread of each roller, rotating in mesh is generated between the at least one toothed portion of the nut and the at least one toothed portion of the second external thread of each roller. This assures that while the planetary assembly is rotating, each roller revolves through pure rolling motion without unexpected friction caused by sliding motion, thereby increasing the smoothness while the whole planetary roller screw is running.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
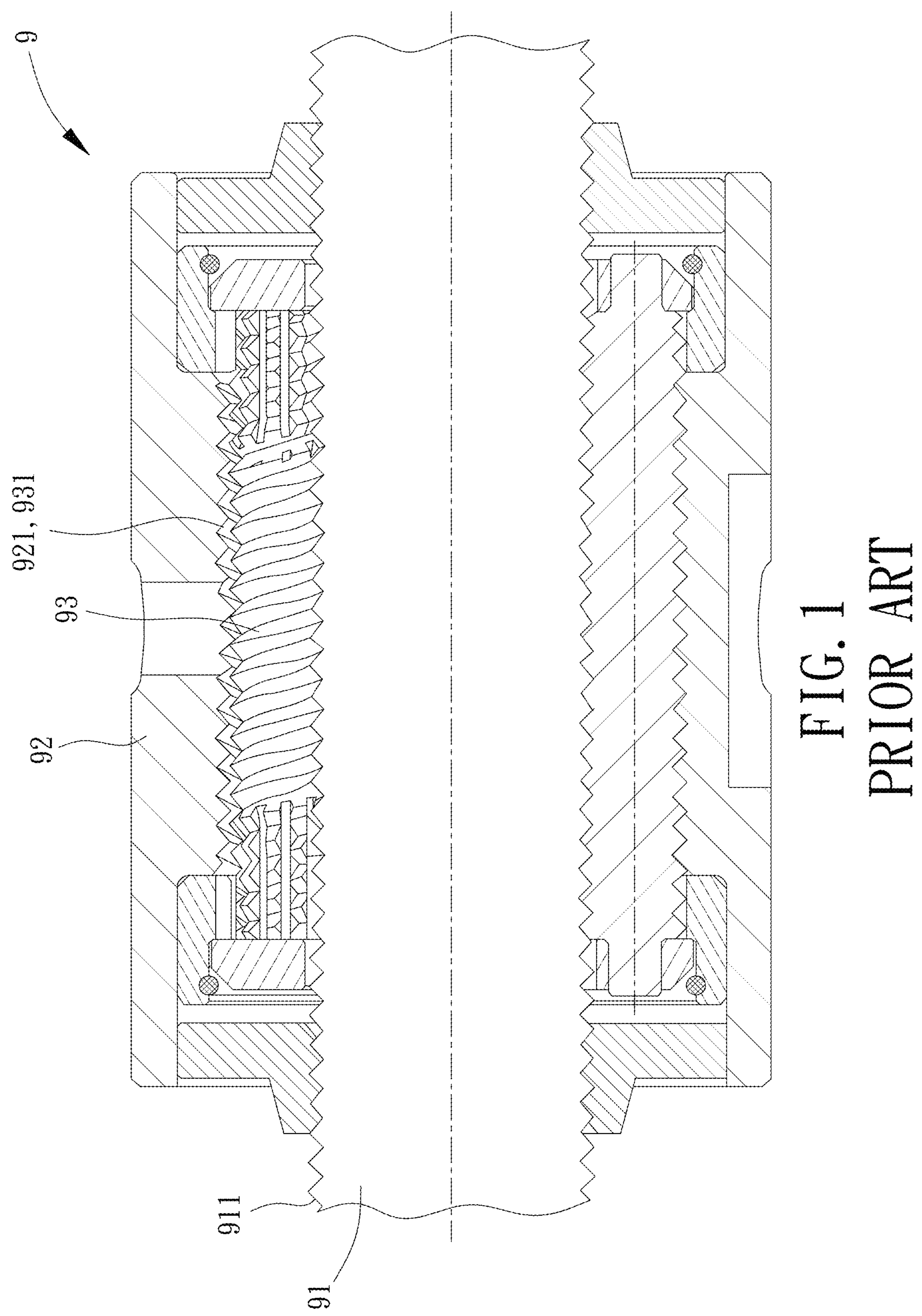
FIG. 1 is a cross sectional view of a conventional planetary roller screw.

When the terms “front”, “rear”, “left”, “right”, “up”, “down”, “top”, “bottom”, “inner”, “outer”, “side”, and similar terms are used herein, it should be understood that these terms have reference only to the structure shown in the drawings as it would appear to a person viewing the drawings and are utilized only to facilitate describing the invention, rather than restricting the invention.

DETAILED DESCRIPTION OF THE INVENTION

In order to make the above and other objectives, features, and advantages of the present invention clearer and easier to understand, preferred embodiments of the present invention will be described hereinafter in connection with the accompanying drawings. Furthermore, the elements designated by the same reference numeral in various figures will be deemed as identical, and the description thereof will be omitted.

Figure 2:
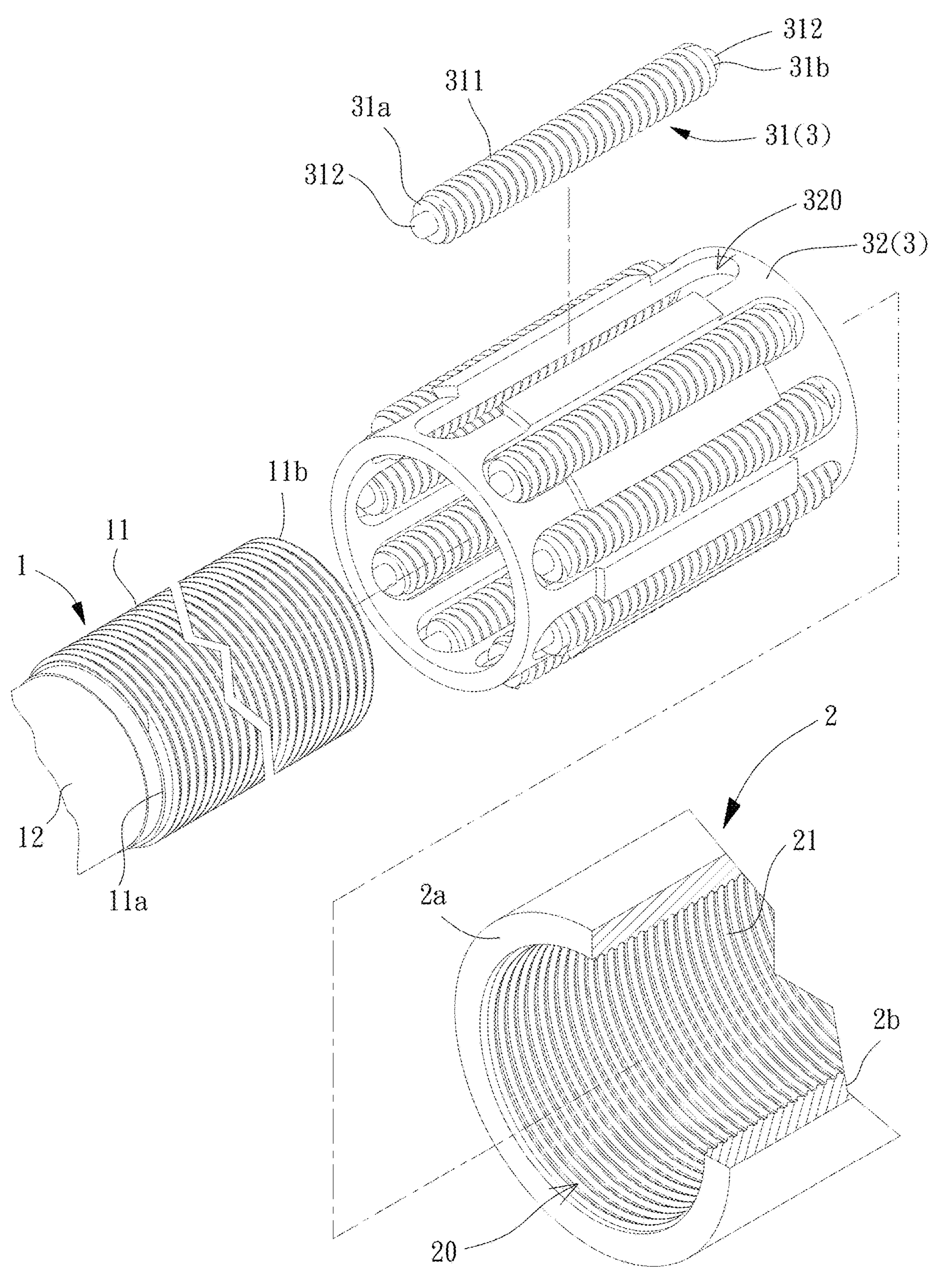
FIG. 2 is an exploded, perspective view of a first embodiment of a planetary roller screw according to the present invention.
Figure 3:
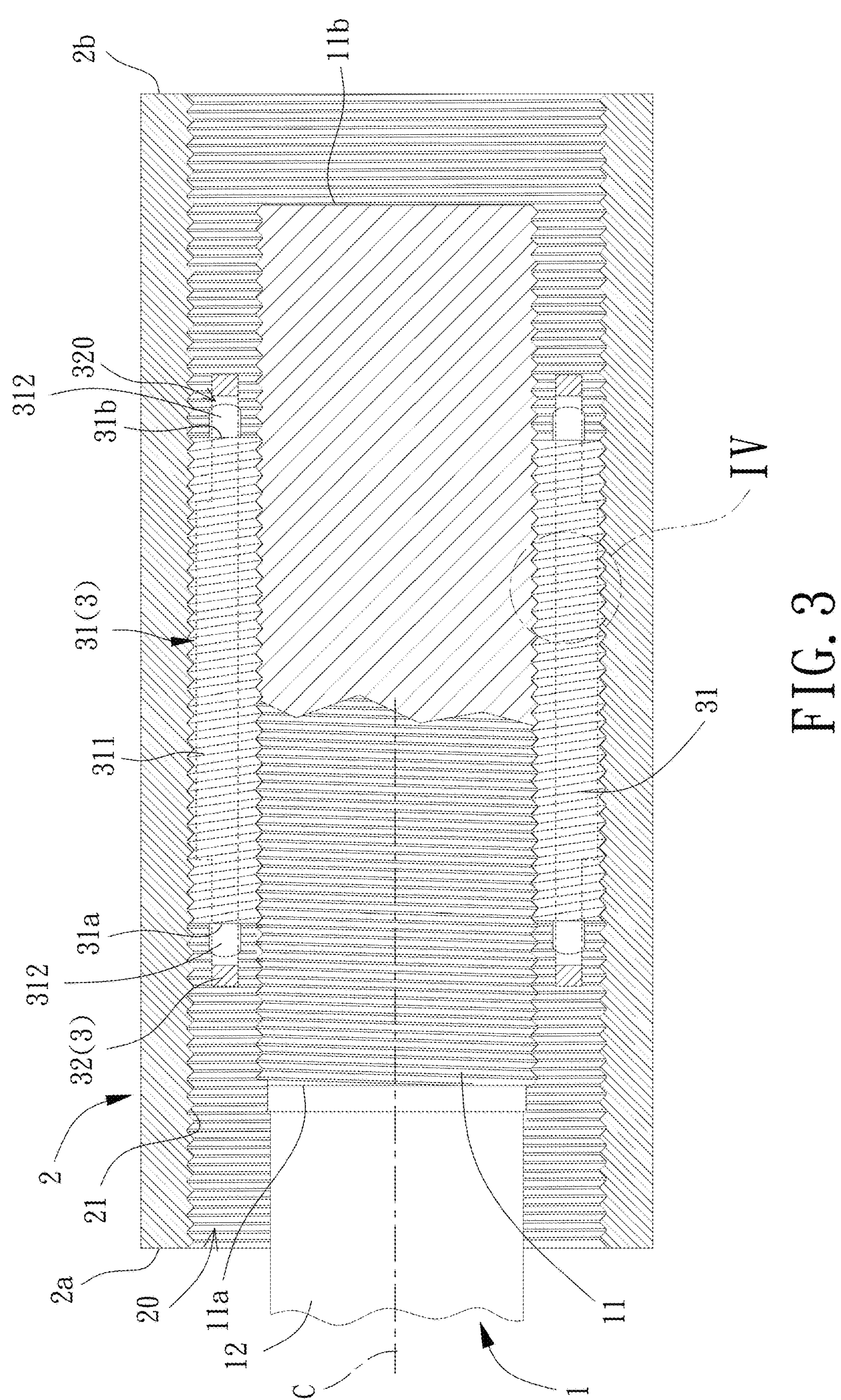
FIG. 3 is a cross sectional view of the planetary roller screw of FIG. 2 after assembly.

With reference to FIGS. 2 and 3, a first embodiment of a planetary roller screw according to the present invention includes a main screw 1, a nut 2, and a planetary assembly 3. The planetary assembly 3 is located in the nut 2 and surrounds the main screw 1. By the above disposition, the planetary roller screw may further have a specific pattern of motion according to a rule of configuration proposed by the present invention. In particular, the planetary roller screw may have a first configuration or a second configuration, each having a different pattern of motion, based on the rule of configuration. The rule of configuration will be illustrated below.

The main screw 1 includes an outer periphery having a first external thread 11 extending along the axis of the main screw 1, where the axis of the main screw 1 defines an axial direction. The helix direction of the first external thread 11 may be either right-handed or left-handed. Optionally, the outer periphery of the main screw 1 may further include a connecting portion 12. Preferably, the first external thread 11 may be located adjacent to an end of the main screw 1, and the connecting portion 12 may be located adjacent to another end of the main screw 1. Furthermore, to clearly explain the directional disposition of the present invention, the main screw 1 is defined to include a central axis C, and the extending direction of the central axis C is defined as an axial direction set fourth throughout the specification.

The nut 2 includes a through-hole 20 extending along the axial direction. The nut 2 includes an inner periphery surrounding the through-hole 20, and the inner periphery has an internal thread 21 extending along the axial direction. The helix direction of the internal thread 21 may be either right-handed or left-handed. Particularly, the helix direction of the internal thread 21 is opposite to the helix direction of the first external thread 11. At least a portion of the main screw 1 is located in the through-hole 20 of the nut 2. Particularly, all or a portion of the first external thread 11 of the main screw 1 is located in the through-hole 20 of the nut 2. Namely, all or a portion of the first external thread 11 is aligned with the internal thread 21 in the radial direction.

The planetary assembly 3 includes plural rollers 31 each extending along another axis parallel to the central axis C. Each roller 31 includes an outer periphery having a second external thread 311. The helix direction of the second external thread 311 of each roller 31 may be either right-handed or left-handed. Particularly, the helix direction of the second external thread 311 of each roller 31 is the same as the helix direction of the internal thread 21 of the nut 2. Namely, the helix direction of the second external thread 311 of each roller 31 is opposite to the helix direction of the first external thread 11 of the main screw 1. At least a portion of each roller 31 is located in the through-hole 20 of the nut 20. Furthermore, the second external thread 311 of each roller 31 meshes with the first external thread 11 of the main screw 1 and the internal thread 21 of the nut 2. Preferably, the rollers 31 are uniformly distributed around the main screw 1 according to the number of the rollers 31. For example, in a case that the number of the rollers 31 is N, the rollers 31 surround the main screw 1 and are spaced from each other by an angle (360/N degrees). N is an integer greater than one, and, preferably, 360 is divisible by N.

Preferably, the planetary assembly 3 further includes an annular frame portion 32. The annular frame portion 32 is disposed between the main screw 1 and the nut 2 and includes plural receiving portions 320. The number of the plural receiving portions 320 is not smaller than the number of the plural rollers 31, such that each roller 31 may be received in a corresponding one of the plural receiving portions 320. Specifically, the number of the plural receiving portions 320 is M, and the receiving portions 320 are formed on the annular frame portion 32 and are spaced from each other by an angle (360/M degrees). M is an integer not smaller than N, and, preferably, 360 is divisible by M. Thus, by the disposition of the annular frame portion 32 and the receiving portions 320, each roller 31 of the planetary assembly 3 may be stably and uniformly distributed around the main screw 1.

In the embodiment of the invention shown in FIG. 2, the annular frame portion 32 has an annular shape with a central through-hole extending along the axial direction to form a tubular member. The plural receiving portions 320 form corresponding plural through-holes in the radial direction of the annular frame portion 32. Each through-hole has a contour corresponding to a respective roller 31, such that each roller 31 may be received in a corresponding one of the plural receiving portions 320. In an example, when each roller 31 is received in a corresponding one of the plural receiving portions 320, each roller 31 is spaced from the corresponding receiving portion 320 in the circumferential direction, which is advantageous to rotation between each roller 31 and the first external thread 11 of the main screw 1 and rotation between each roller 31 and the internal thread 21 of the nut 2. Thus, by the disposition of the plural receiving portions 320 of the annular frame portion 32, aside from permitting easy installation of the plural rollers 31 between the main screw 1 and the nut 2, each roller 31 may be stably disposed between the main screw 1 and the nut 2. Thus, deviation is less likely to occur.

Optionally, each of two ends of each roller 31 in the axial direction may include a protruding portion 312 extending outward along the axial direction of the roller 31, particularly along the central axis of each roller 31. The diameter of each protruding portion 312 is not greater than the diameter of the roller 31 and is preferably smaller than the diameter of the roller 31, such that when each roller 31 is received in the corresponding receiving portion 320 and when each roller 31 comes into contact with the annular frame portion 32 in the axial direction, each roller 31 comes into contact with the annular frame portion 32 (at a peripheral edge of the corresponding receiving portion 320) by the protruding portions 312, thereby reducing the friction while each roller 3 rotates in the corresponding receiving portion 320.

Figure 4:
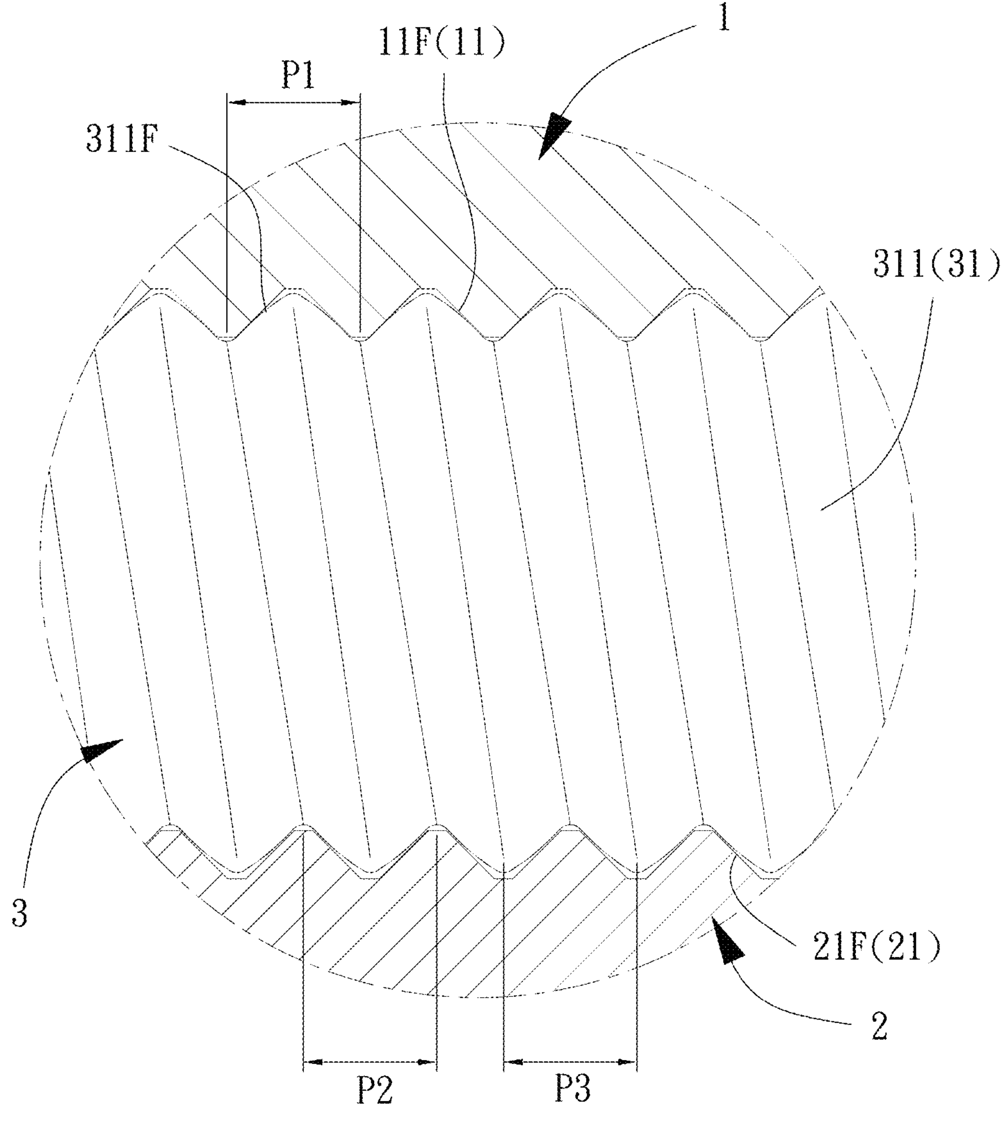
FIG. 4 is an enlarged view of a circled portion IV of FIG. 3.

Specifically, as shown in FIG. 4, the pitch P1 of the first external thread 11 of the main screw 1, the pitch P2 of the internal thread 21 of the nut 2, and the pitch P3 of the second external thread 311 of each roller 31 are identical.

Preferably, the flank 311F of the second external thread 311 of each roller 31 is arcuate to reduce the contact area and thereby reducing the friction between the second external thread 311 of each roller 31 and the first external thread 11 of the main screw 1 and the contact area between the second external thread 311 of each roller 31 and the internal thread 21 of the nut 2. This reduces generation of noise and increases the rotational smoothness. It should be noted that in other examples, any of the flank 11F of the first external thread 11 of the main screw 1, the flank 21F of the internal thread 21 of the nut 2, and the flank 311F of the second external thread 311 of each roller 31 may be optionally arcuate. The present invention is not limited in this regard.

Figure 5:
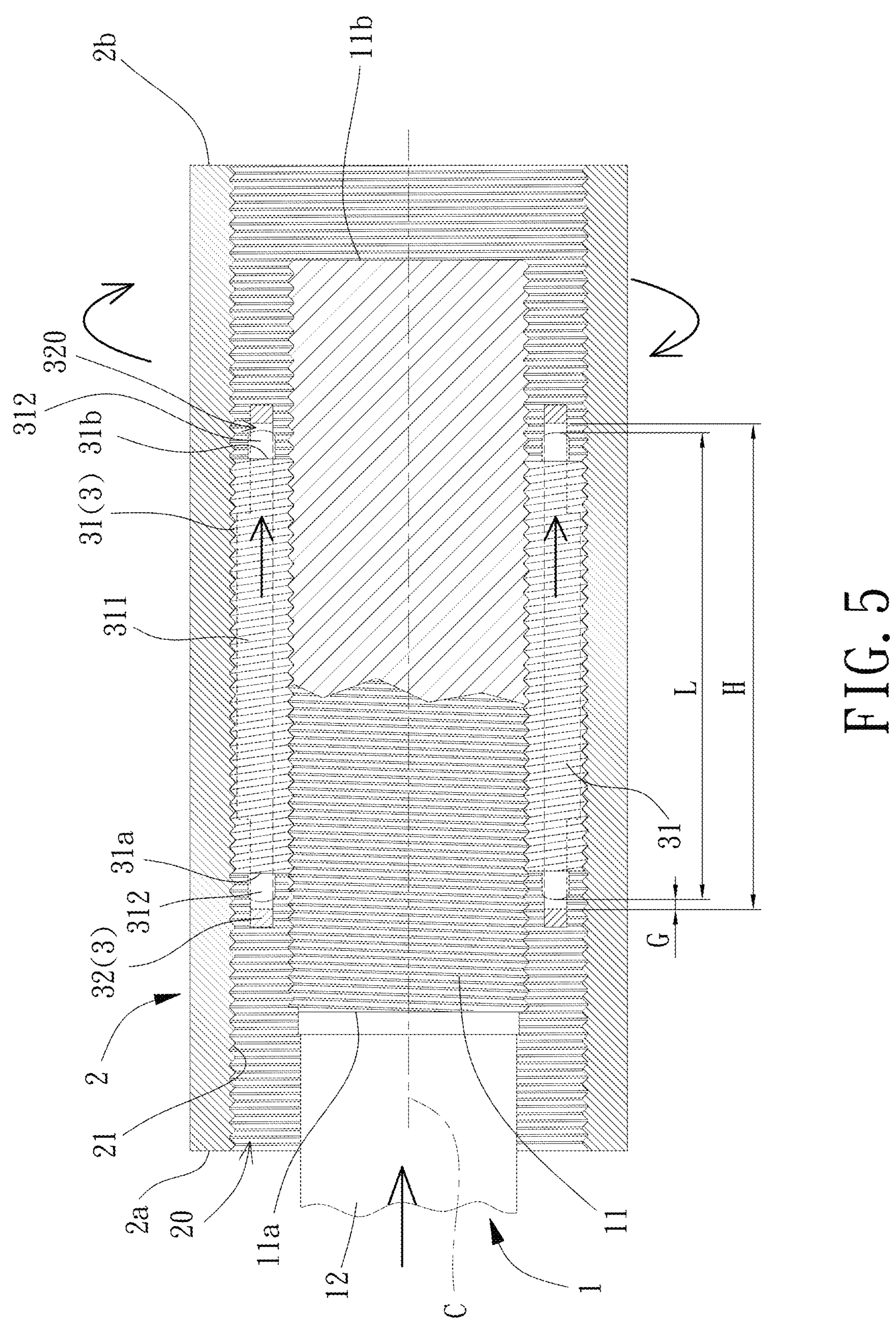
FIG. 5 is a schematic cross sectional view illustrating the motion relationship between the components of the planetary roller screw according to the present invention in which a nut is used as a driving member.
Figure 6:
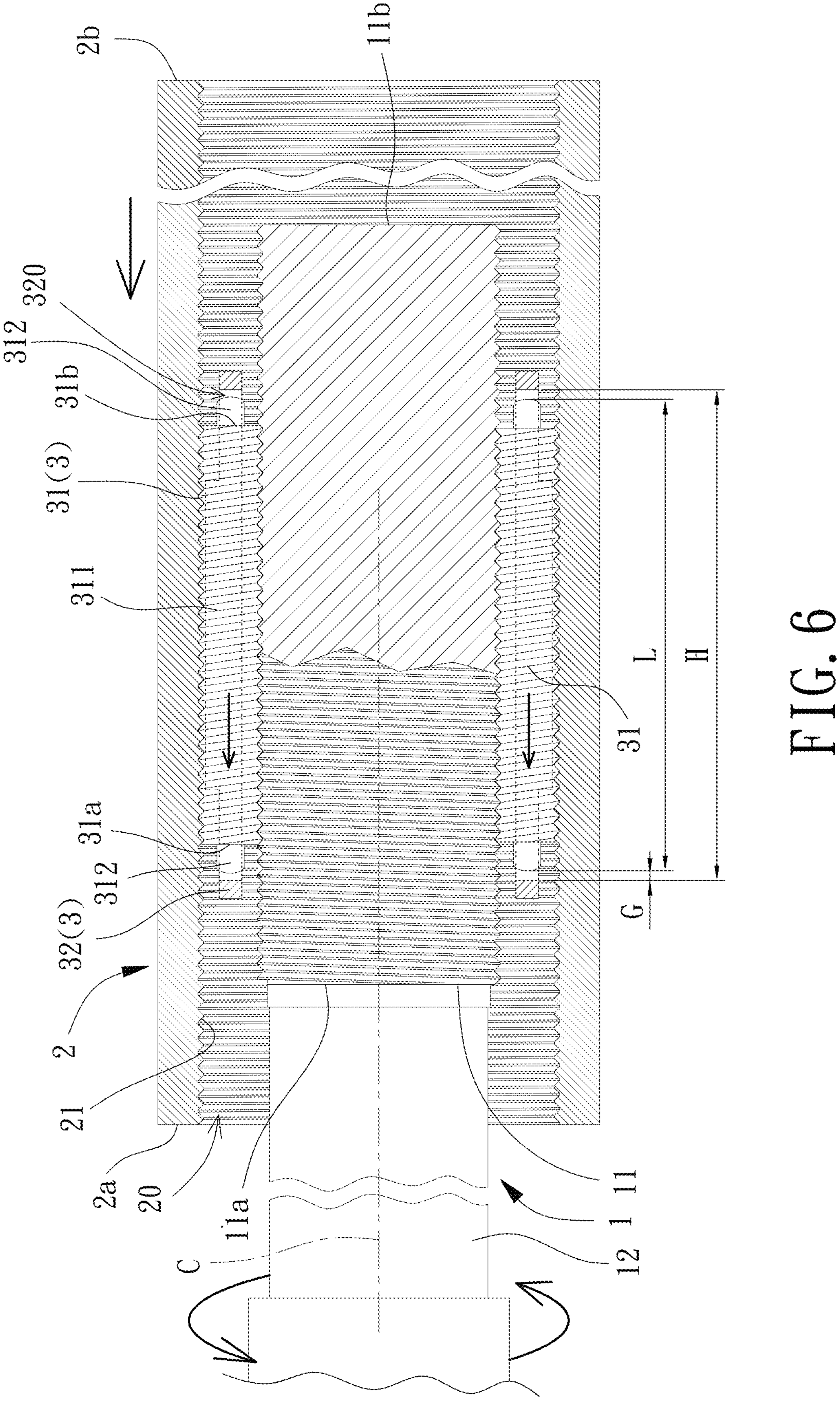
FIG. 6 is a schematic cross sectional view illustrating the motion relationship between the components of the planetary roller screw according to the present invention in which a main screw is used as a driving member.

As shown in FIGS. 2-4, it should be particularly noted that each roller 31 is disposed in a height between the main screw 1 and the nut 2 in the axial direction, which may vary according to the lead angle of the main screw 1 and the nut 2 and the angular position of each roller 31 disposed between the main screw 1 and the nut 2 in the circumferential direction (the rollers 31 are different in the relative angle). In a practical example, in response to the change in the height of each roller 31 in the axial direction, each receiving portion 320 of the annular frame portion 32 may include a through-hole height H greater than the length L of each roller 31 in the axial direction, thereby providing the gap G, as shown in FIGS. 5 and 6. Furthermore, the through-hole height H is greater than the length L of each roller 31 by a length not smaller than 0.5 times the pitch P3, preferably by a length not smaller than 1 time the pitch P3. Optionally, in another example (not illustrated), to permit easy installation of each roller 31 between the main screw 1 and the nut 2, the disposition of the height position of each receiving portion 320 of the annular frame portion 32 in the axial direction may be varied according to the practical needs. Alternatively, in a further example (not illustrated), the length of the protruding portions 312 on two ends of each roller 31 in the axial direction may be varied without changing the disposition of the height position of each receiving portion 320 of the annular frame portion 32 in the axial direction. Thus, when each roller 31 is disposed in the corresponding receiving portion 320, each roller 31 may have a corresponding height in the axial direction suitable for disposition on the main screw 1 and/or the nut 2.

With the disposition shown in FIGS. 2-4, the present invention proposes a rule of configuration. Given the conditions that the helix direction of the first external thread 11 of the main screw 1 and the helix direction of the internal thread 21 of the nut 2 are opposite, and the helix direction of the internal thread 21 of the nut 2 and the helix direction of the second external thread 311 of each roller 31 are identical, one of the main screw 1 and the nut 2 is a driving member, and the other two of the main screw 1, the nut 2 and the planetary assembly 3 that are not the driving member are two followers. The rule of configuration requires that the ratio of the pitch circle diameters between the two followers and the ratio of the numbers of thread starts between the two followers to be the same, and the number of thread starts of the nut 2 to be not equal to the sum of the number of thread starts of the main screw 1 and twice the number of thread starts of each roller 31. Preferably, the number of thread starts of the nut 2 is equal to: the number of thread starts of the main screw 1 plus twice the number of thread starts of each roller 31 and then plus 1 or minus 1; or the number of thread starts of the main screw 1 is equal to: the number of thread starts of the nut 2 minus twice the number of thread starts of each roller 31 and then plus 1 or minus 1. Thus, according to the rule of configuration, when rotating the driving member, the driving member displaces relative to the two followers in the axial direction, and no relative displacement occurs between the two followers in the axial direction.

Specifically, FIG. 5 shows the first configuration according to the above-mentioned rule of configuration. The nut 2 is the driving member. The ratio of the pitch circle diameter of the main screw 1 to the pitch circle diameter of each roller 31 is identical to the ratio of the number of thread starts of the main screw 1 to the number of thread starts of each roller 31. In addition, the number of thread starts of the nut 2 is not equal to the sum of the number of thread starts of the main screw 1 and twice the number of thread starts of each roller 31. Namely, the number of thread starts of the main screw 1 is not equal to the number of thread starts of the nut 2 minus twice the number of thread starts of each roller 31. As a result, the ratio of the pitch circle diameter of the nut 2 to the pitch circle diameter of each roller 31 is different from the ratio of the number of thread starts of the nut 2 to the number of thread starts of each roller 31. To clearly illustrate the rule of configuration, the number of thread starts and the pitch circle diameter of the main screw 1 are represented as $T_1$ and $D_1$, respectively; the number of thread starts and the pitch circle diameter of the nut 2 are represented as $T_2$ and $D_2$, respectively; and the number of thread starts and the pitch circle diameter of each roller 31 are represented as $T_3$ and $D_3$, respectively. The first configuration according to the rule of configuration can be represented as $D_1/D_3=T_1/T_3$ and $T_2 \neq T_1+2T_3$ (namely, $T_1 \neq T_2-2T_3$), such that $D_2/D_3 \neq T_2/T_3$. Preferably, the number of thread starts of the nut 2 is equal to: the number of thread starts of the main screw 1 plus twice the number of thread starts of each roller 31 and then plus 1 or minus 1. Namely, $T_2=T_1+2T_3\pm1$. Preferably, the number of thread starts of the main screw 1 is equal to the pitch circle diameter of the main screw 1 divided by the pitch circle diameter of each roller 3. Namely, $T_1=D_1/D_3$.

More specifically, in an example according to the first configuration, the pitches of the main screw 1, the nut 2 and each roller 31 are all 1.5 millimeters (mm). The main screw 1 has a pitch circle diameter of 18 mm and three thread starts. Each roller 31 has a pitch circle diameter of 6 mm and one thread start. The nut 2 has a pitch circle diameter of 30 mm and six thread starts. When the nut 2 rotates one round, the main screw 1 displaces approximately 0.8 mm relative to the nut 2. In other words, in this case, a lead of the nut 2 rotating one round is the product of its pitch (1.5 mm) and its number of thread starts (6), which equals 9 mm. Dividing the lead (9 mm) by the output displacement (0.8 mm) of the main screw 1 or the planetary assembly 3 yields a corresponding displacement decelerated ratio, which equals 11.25 (times).

Specifically, FIG. 6 shows the second configuration according to the above-mentioned rule of configuration. The main screw 1 is the driving member. The ratio of the pitch circle diameter of the nut 2 to the pitch circle diameter of each roller 31 is identical to the ratio of the number of thread starts of the nut 2 to the number of thread starts of each roller 31. In addition, the number of thread starts of the nut 2 is not equal to the sum of the number of thread starts of the main screw 1 and twice the number of thread starts of each roller 31. As a result, the ratio of the pitch circle diameter of the main screw 1 to the pitch circle diameter of each roller 31 is different from the ratio of the number of thread starts of the main screw 1 to the number of thread starts of each roller 31. Namely, the second configuration according to the rule of configuration can be represented as $D_2/D_3=T_2/T_3$ and $T_2 \neq T_1+2T_3$, such that $D_1/D_3 \neq T_1/T_3$. Preferably, the number of thread starts of the main screw 1 is equal to: the number of thread starts of the nut 2 minus twice the number of thread starts of each roller 31 and then plus 1 or minus 1. Namely, $T_1=T_2-2T_3\pm1$.

More specifically, in an example according to the second configuration, the pitches of the main screw 1, the nut 2 and each roller 31 are all 4 mm. The main screw 1 has a pitch circle diameter of 30 mm and four thread starts. Each roller 31 has a pitch circle diameter of 10 mm and one thread start. The nut 2 has a pitch circle diameter of 50 mm and five thread starts. When the main screw 1 rotates one round, the nut 2 displaces approximately 2 mm relative to the main screw 1. In other words, in this case, a lead of the main screw 1 rotating one round is the product of its pitch (4 mm) and its number of thread starts (4), which equals 16 mm. Dividing the lead (16 mm) by the output displacement (2 mm) of the nut 2 or the planetary assembly 3 yields a corresponding displacement decelerated ratio, which equals 8 (times).

Preferably, in another example according to the second configuration, a further condition is met: the number of thread starts of the main screw 1 is equal to the pitch circle diameter of the main screw 1 divided by the pitch circle diameter of each roller 3. Namely, $T_1=D_1/D_3$. The pitches of the main screw 1, the nut 2 and each roller 3 are the same. The main screw 1 has a pitch circle diameter of 20 mm and one thread start. Each roller 31 has a pitch circle diameter of 20 mm and one thread start. The nut 2 has a pitch circle diameter of 60 mm and six thread starts. In this example, the following equations are satisfied: $D_2/D_3=T_2/T_3$, $T_1=D_1/D_3$ and $T_1=T_2-2T_3-1$ ($D_1/D_3 \neq T_1/T_3$).

It should be noted that, based on the mechanism of the planetary roller screw according to the present invention, the helix direction of the internal thread 21 of the nut 2 is the same as the helix direction of the second external thread 311 of each roller 31 and is opposite to the helix direction of the first external thread 11 of the main screw 1. In other words, the component disposition from the outer side to the inner side may be deemed as nut 2-rollers 31-main screw 1, and the helix directions may be represented as right-right-left or left-left-right.

It should also be noted that, based on the rule of configuration as shown in FIGS. 5 and 6, given that the pitch circle diameter of the main screw 1: the pitch circle diameter of the nut 2: the pitch circle diameter of each roller 31 remains 3:5:1, the planetary roller screw according to the present invention has a displacement decelerated ratio being approximately 11.25 times under the first configuration in the example with the nut 2 being the driving member, and a displacement decelerated ratio being approximately 8 times under the second configuration in the example with the main screw 1 being the driving member. However, if similar configuration conditions are applied in the conventional technique in which all helix directions are the same, namely, the pitch circle diameter of the main screw 91: the pitch circle diameter of the nut 92: the pitch circle diameter of each roller 93 is made 3:5:1 and all pitches are made 4 mm. The main screw 91 is provided with a pitch circle diameter of 30 mm and five thread starts. Each roller 93 is provided with a pitch circle diameter of 10 mm and one thread start. The nut 92 is provided with a pitch circle diameter of 50 mm and five thread starts. When the main screw 91 rotates one round, the nut 92 displaces approximately 20 mm relative to the main screw 91. In other words, in this case, a lead of the main screw 91 rotating one round is the product of its pitch (4 mm) and its number of thread starts (5), which equals 20 mm. Dividing the lead (20 mm) by the output displacement (20 mm) of the nut 92 yields a corresponding displacement decelerated ratio, which equals 1 (time). Accordingly, based on similar disposition condition, the planetary roller screw according to the present invention has a better displacement decelerated ratio. It should also be noted that the specific ratios of the pitch circles among the elements and the specific values of the pitches, the pitch circle diameters and/or the number of thread starts are merely examples for better illustrating the present invention, and the present invention is not limited thereto.

Thus, based on the disposition of helix directions and the rules of configuration according to the present invention, under a pitch disposition condition the same as or similar to the conventional technique, the present invention can have the relative displacement between the main screw 1 and the nut 2 reduced to achieve more precise motion control. Furthermore, since the pitch disposition condition of the main screw 1, the nut 2, and the rollers 31 remain the original state (not adjusted to a tighter condition) without incurring additional processing costs, the main screw 1, the nut 2, and the rollers 3 may maintain the same load withstanding capacity. Namely, in comparison with the conventional technique shown in FIG. 1, when it is desired to achieve the same precision control of displacement (namely, the follower has the same displacement when the driving member rotates one round), the planetary roller screw according to the present invention may have a larger pitch and, thus, have better load withstanding capacity, thereby saving the manufacturing costs.

Figure 7:
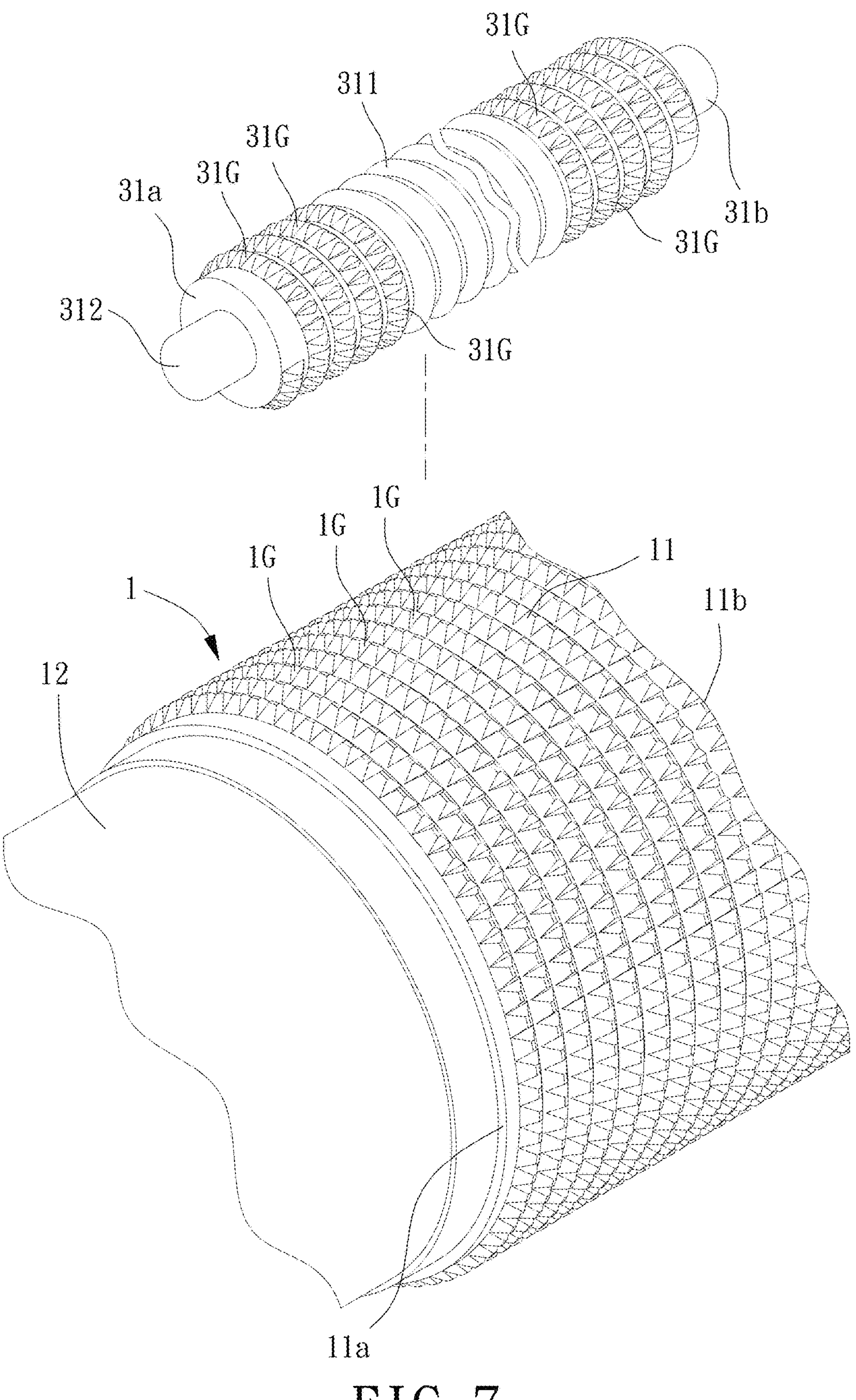
FIG. 7 is a schematic view illustrating a main screw and a roller with meshable toothed portions.
Figure 8:
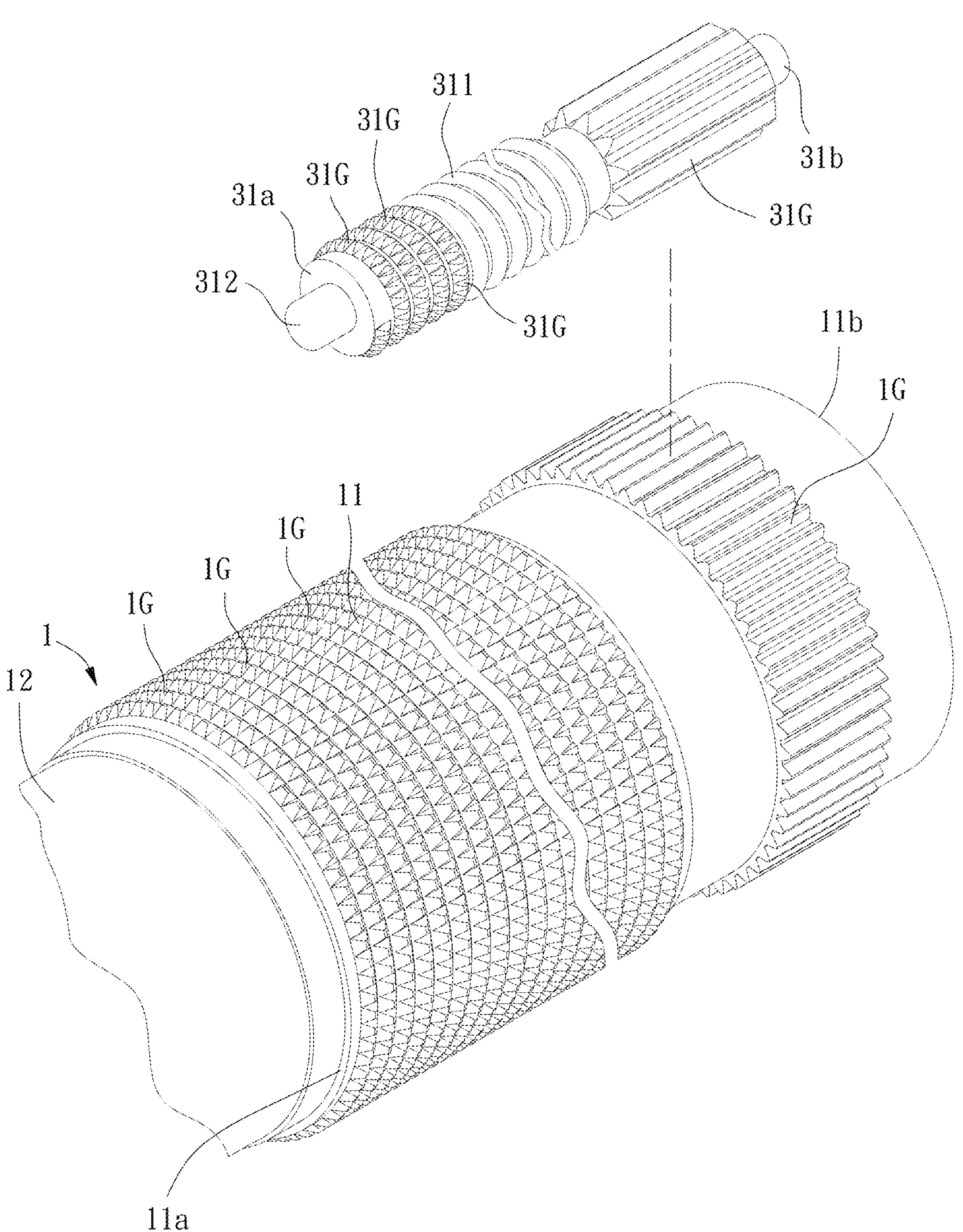
FIG. 8 is a schematic view illustrating a main screw and a roller with meshable toothed portions and meshable spur gears.

Please refer to FIGS. 7 and 8 showing another preferred disposition of the main screw 1 and each roller 31 of the planetary assembly according to the present invention. In comparison with FIGS. 2-4, the main screw 1 further includes at least one toothed portion 1G. Each roller 31 further includes at least one toothed portion 31G, such that when screwed rotating occurs between the first external thread 11 of the main screw 1 and the second external thread 311 of each roller 31, rotating in mesh is generated between the at least one toothed portion 1G of the main screw 1 and the at least one toothed portion 31G of each roller 31. Furthermore, through the rotating in mesh between the at least one toothed portion 1G and the at least one toothed portion 31G, when the planetary assembly 3 rotates (each roller 31 revolves about the main screw 1), each roller 31 revolves through pure rolling/rotation without unexpected friction caused by sliding motion, thereby increasing the smoothness while the whole planetary roller screw is running.

In the example shown in FIG. 7, the main screw 1 includes a toothed portion 1G disposed throughout the first external thread 11 of the main screw 1. Nevertheless, in other examples (not illustrated), the toothed portion 1G may be arranged to be in the form of a single section or plural sections disposed on a single local area or plural local areas of the main screw 1 or the first external thread 11 of the main screw 1. Each roller 31 includes two toothed portions 31G respectively disposed on two local areas adjacent to two ends (namely, the top end 31*a* and the bottom end 31*b* of the roller 31) along the axial direction of the second external thread 311 of each roller 31. Nevertheless, in other examples (not illustrated), the toothed portion 31G may be arranged to be in the form of a single section disposed throughout the second external thread 311 of each roller 31, or arranged to be in the form of a single section or plural sections disposed on a single local area or plural local areas of each roller 31 or the second external thread 311 of each roller 31. Particularly, the toothed portion 1G is in the form of plural recessed structures or plural protrusive structures formed on the first external thread 11 of the main screw 1. The toothed portions 31G are used to mesh with the toothed portion 1G and are in the form of plural protrusive structures or plural recessed structures formed on the second external thread 311 of each roller 31.

The example shown in FIG. 8 is different from that the example shown in FIG. 7 by that the main screw 1 further includes another toothed portion 1G disposed on an outer portion of one of the two ends in the axial direction of the first external thread 11 of the main screw 1. The another toothed portion 1G has a spur gear structure. One of the two toothed portions 31G of each roller 31 is disposed on an outer portion of one of the two ends of the second external thread 311 of each roller 31 in the axial direction. Furthermore, one of the two the toothed portions 31G has a spur gear structure to mesh with one of the two toothed portions 1G with the spur gear structure. It should be noted that the toothed portion 1G with the spur gear structure and the toothed portion 31G with the spur gear structure shown in FIG. 8 are disposed on the outer portion of the bottom end 11*b* of the main screw 1 and the outer portion of the bottom end 31*b* of the respective roller 31, respectively. Nevertheless, in other dispositions, the toothed portion 1G with the spur gear structure and the toothed portion 31G with the spur gear structure may be disposed on the outer portion of the top end 11*a* of the main screw 1 and the outer portion of the top end 31*a* of the respective roller 31. In another example (not illustrated), the main screw 1 may include two toothed portions 1G (with spur gear structures) respectively disposed on the outer portion of one of the two ends of the first external thread 11 of the main screw 1 and the outer portion of another of the two ends of the first external thread 11 of the main screw 1, such that the first external thread 11 of the main screw 1 is located between the two toothed portions 1G. Each roller 31 may also include two toothed portions 31G (with spur gear structures) respectively disposed on the outer portion of one of the two ends of the second external thread 311 of the roller 31 and the outer portion of another of the two ends of the second external thread 311 of the roller 31, such that the second external thread 311 of the roller 31 is located between the two toothed portions 31G.

Figure 9:
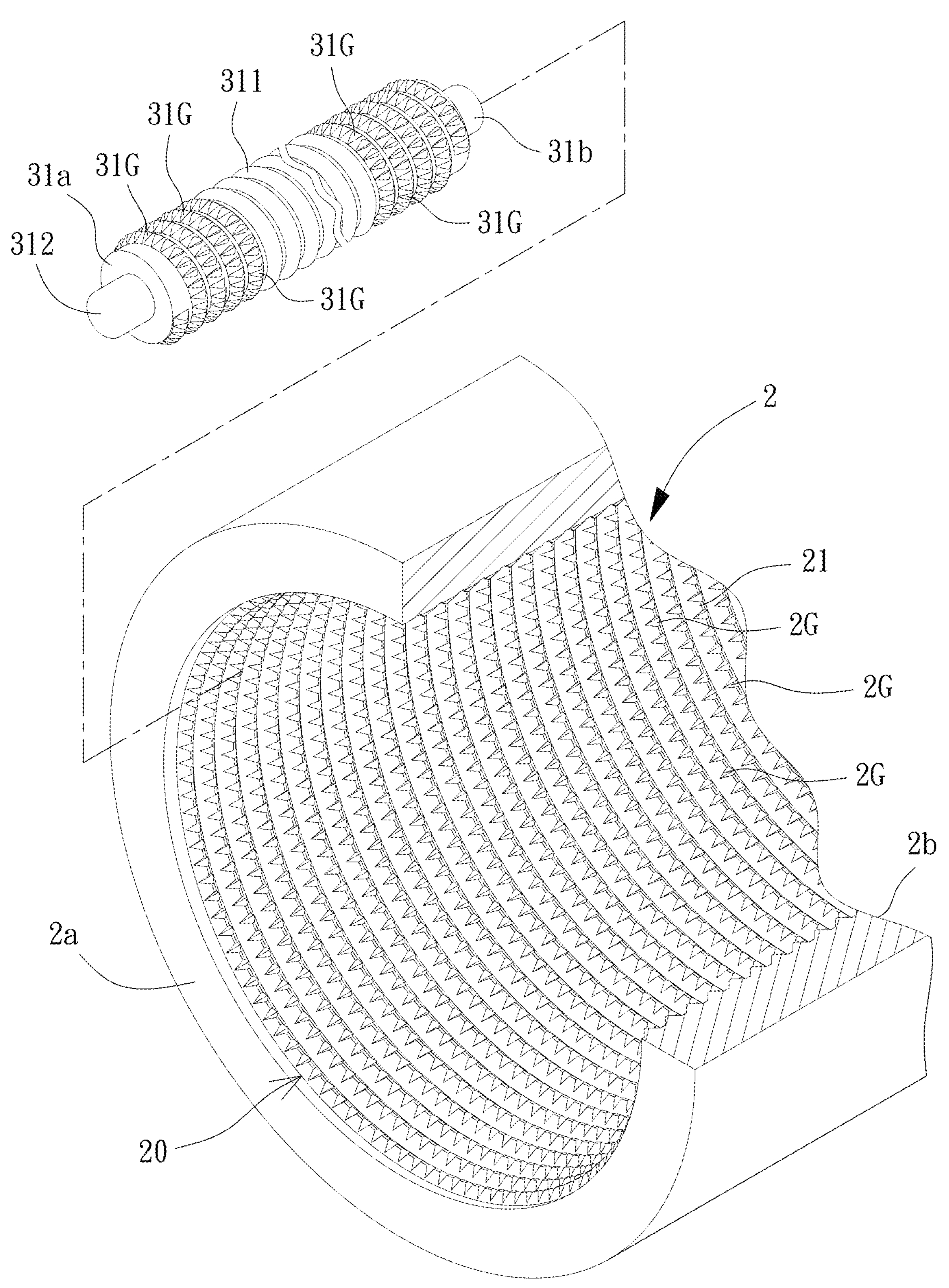
FIG. 9 is a schematic view illustrating a nut and a roller with meshable toothed portions.
Figure 10:
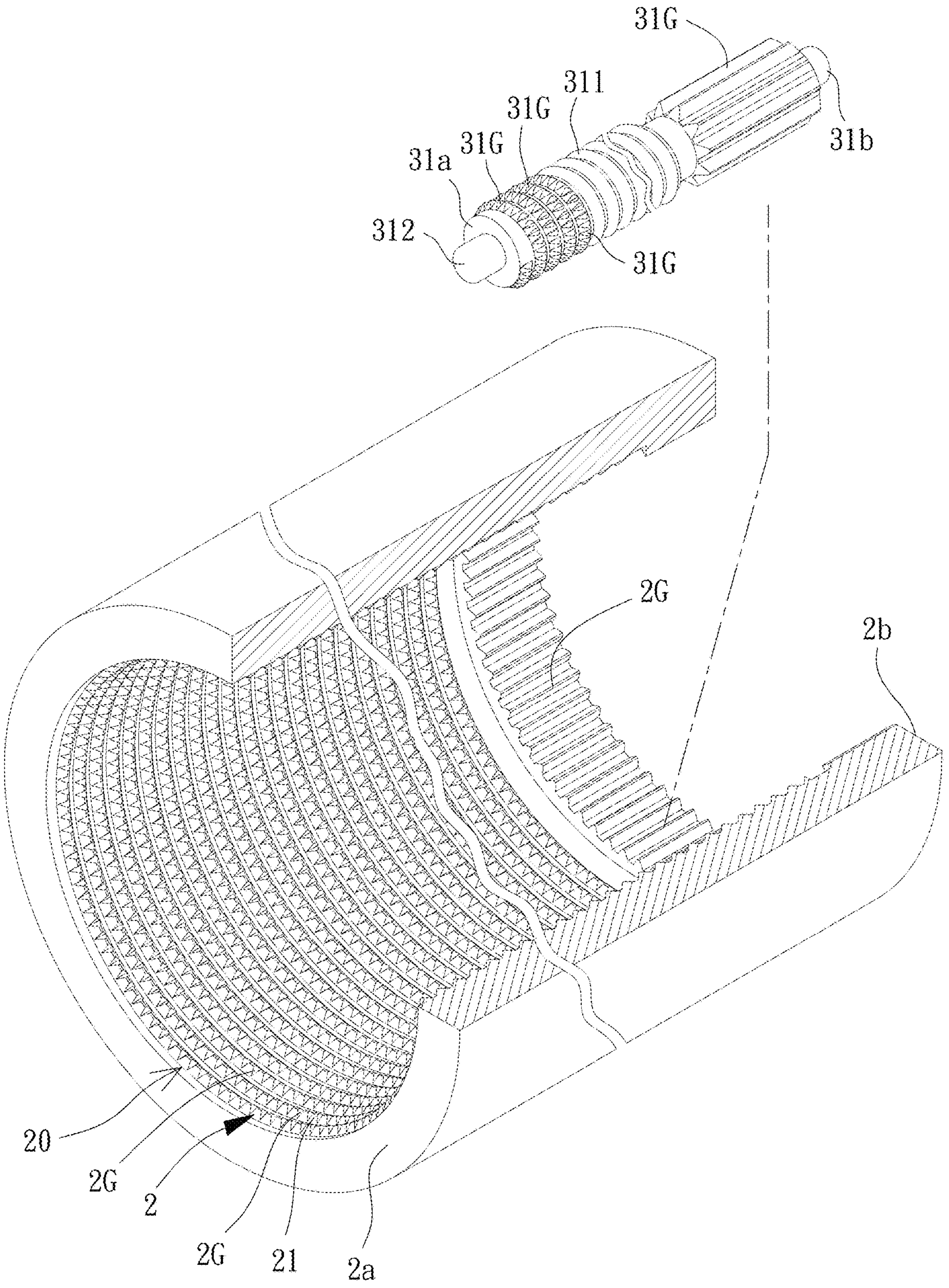
FIG. 10 is a schematic view illustrating a nut and a roller with meshable toothed portions and meshable spur gears.

Please refer to FIGS. 9 and 10 showing another preferred disposition of the nut 2 and each roller 31 of the planetary roller screw according to the present invention, which is similar to the disposition shown in FIGS. 7 and 8. The nut 2 further includes at least one toothed portion 2G. Each roller 31 further includes at least one toothed portion 31G, such that when screwed rotating occurs between the internal thread 21 of the nut 2 and the second external thread 311 of each roller 31, rotating in mesh is generated between the at least one toothed portion 2G of the nut 2 and the at least one toothed portion 31G of the second external thread 311 of each roller 31. Furthermore, through the rotating in mesh between the at least one toothed portion 2G of the nut 2 and the at least one toothed portion 31G of each roller 31, when the planetary assembly 3 rotates (each roller 31 revolves about the main screw 1), each roller 31 revolves through pure rolling/rotation without unexpected friction caused by sliding motion, thereby increasing the smoothness while the whole planetary roller screw is running.

In the example shown in FIG. 9, the nut 2 includes a toothed portion 2G disposed throughout the external thread 21. Nevertheless, in other examples (not illustrated), the toothed portion 2G may be arranged to be in the form of a single section or plural sections disposed in a single local area or plural local areas of the nut 2 or the internal thread 21 of the nut 2. Each roller 31 includes two toothed portions 31G respectively disposed on two local areas respectively adjacent to the two ends (namely, the top end 31*a* and the bottom end 31*b*) of the second external thread 311 of the roller 31. In other examples (not illustrated), the toothed portion 31G may be arranged to be in the form of a single section disposed throughout the second external thread 311 or in the form of a single section or plural section disposed in a single local area or plural local areas of the roller 31 or the second external thread 311 of the roller 31.

The example shown in FIG. 10 is different from the example shown in FIG. 9 by that the nut 2 further includes another toothed portion 2G disposed on an outer portion of one of the two ends in the axial direction of the internal thread 21 of the nut 2. Furthermore, the another toothed portion 2G has a spur gear structure. One of the two toothed portions 31G of each roller 31 is disposed on an outer portion of one of the two ends of the second external thread 311 of the roller 31 in the axial direction. Furthermore, the one of the two toothed portions 31G has a spur gear structure to mesh with the toothed portion 2G with the spur gear structure. It should be noted that the toothed portion 2G with the spur gear structure and the toothed portion 31G with the spur gear structure shown in FIG. 10 are disposed on the outer portion of the bottom end 2*b* of the nut 2 and the outer portion of the bottom end 31*b* of the respective roller 31, respectively. Nevertheless, in other dispositions, the toothed portion 2G with the spur gear structure and the toothed portion 31G with the spur gear structure may be disposed on the outer portion of the top end 2*a* of the nut 2 and the outer portion of the top end 31*a* of the respective roller 31. In another example (not illustrated), the nut 2 may include two toothed portions 2G (with spur gear structures) respectively disposed on the outer portion of one of the two ends of the internal thread 21 and the outer portion of another of the two ends of the internal thread 21, such that the internal thread 21 is located between the two toothed portions 2G. Each roller 31 may also include two toothed portions 31G (with spur gear structures) respectively disposed on the outer portion of one of the two ends of the second external thread 311 of the roller 31 and the outer portion of another of the two ends of the second external thread 311 of the roller 31, such that the second external thread 311 of the roller 31 is located between the two toothed portions 31G.

It should be noted that, according to the examples shown in FIGS. 7-10, to make each roller 31 undergoes a motion pattern of pure rolling relative to the main screw 1 and the nut 2, the "toothed portion" according to the present invention may be disposed on the main screw 1 and each roller 31, or disposed on the nut 2 and each roller 31, or disposed on the main screw 1, the nut 2, and each roller 31. The term "toothed portion" refers to the toothed portion 1G of the main screw 1, the toothed portion 2G of the nut 2, and the toothed portion 31G of each roller 31. Particularly, the location and area/range of the toothed portion disposed on the main screw 1, the nut 2, and each roller 31 may be arranged according to the displacement range of the main screw 1, the nut 2, and each roller 31. Particularly, while forming the characteristics of the toothed portions, the corresponding pitch circle diameters of the first external thread 11 of the main screw 1, the inner thread of the nut 2, and the second external thread 311 of each roller 31 must be considered, and, preferably, the smallest one of the pitch circle diameters is a division factor of the remaining pitch circle diameters.

It should be further noted that the toothed portions shown in FIGS. 8 and 10 use spur gear structures to achieve rotating in mesh parallel to the axial direction. Nevertheless, the present invention is not limited to spur gears and may include other structures capable of achieving rotating in mesh parallel to the axial direction.

Figure 11:
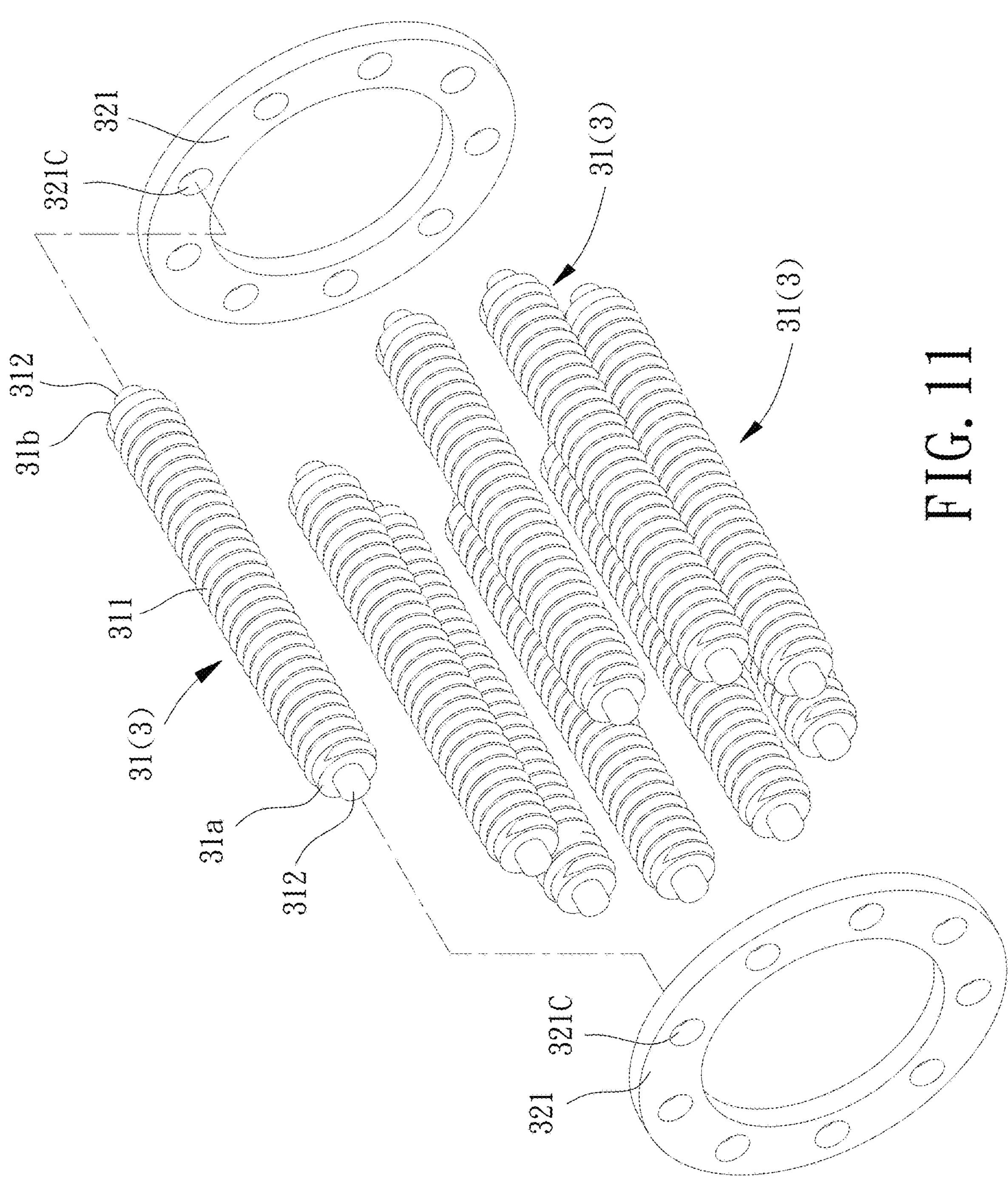
FIG. 11 is an exploded, perspective view of another preferred disposition of a planetary assembly of the planetary roller screw according to the present invention.
Figure 12:
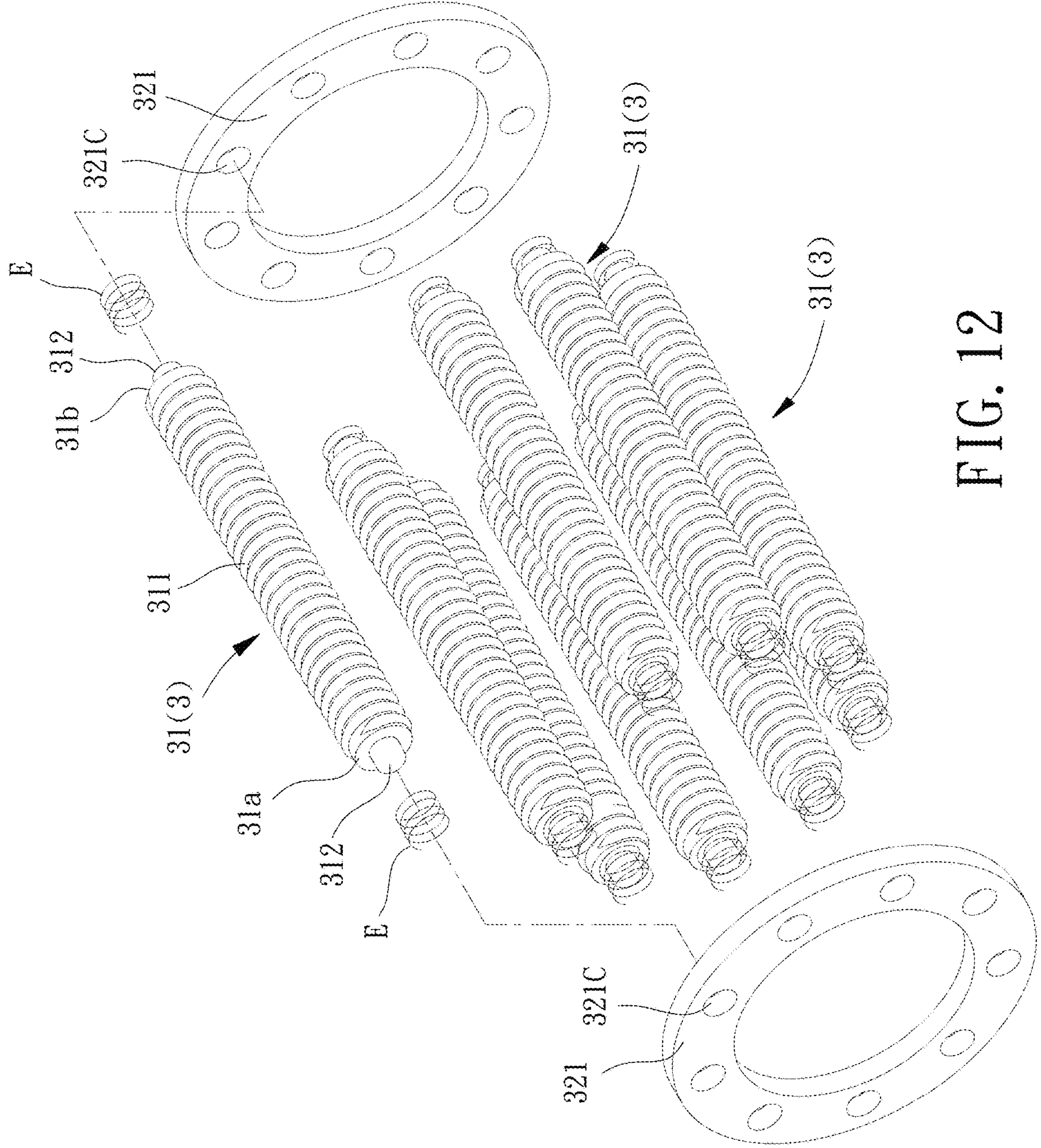
FIG. 12 is an exploded, perspective view similar to FIG. 11 with an elastic element disposed on each protruding portion of each roller.

Furthermore, referring to FIG. 11 showing a further preferred disposition of the planetary assembly 3 of the planetary roller screw according to the present invention, the annular frame portion 32 includes two rings 321 spaced from each other along the axial direction. Each of the two rings 321 includes plural recessed portions 321C spaced from each other in a circumferential direction about the axis. The plural recessed portions 321C of one of the two rings 321 are aligned with the plural recessed portions 321C of another of the two rings 321. Each protruding portion 312 of each roller 31 is partially received in a respective one of the recessed portions 321C. Particularly, each roller 31 may have a structure shown in FIGS. 2 and 7-10. It should be noted that although the recessed portions 321C shown in FIG. 12 are in the form of through-holes, the recessed portions 321C are not limited to thereto. As an example, the recessed portions 321C may be recesses rather than the through-hole structures.

Optionally, as shown in FIG. 12, each protruding portion 312 of each roller 31 is provided with an elastic element E. Each elastic element E is disposed between and abuts against a respective annular frame portion 32 and a respective roller 31. Thus, each elastic element E biases the respective roller 31 to keep a certain tension in the axial direction to avoid the respective roller 31 from deviating away from the axial direction during motion. Preferably, each elastic element E may be in the form of a coil spring.

Based on the disposition and motion mechanism of the planetary roller screw according to the present invention, one of the main screw 1, the nut 2, and each roller 31 may be used as a driving member, and the other two of the main screw 1, the nut 2, and each roller 31 are followers. When the driving member rotates, the linear displacement direction of the planetary assembly 3 relative to the nut 2 is opposite to the linear displacement direction of the main screw 1 relative to the planetary assembly 3. Furthermore, the demands in the motion relationship and precision of the main screw 1, the nut 2, and each roller 31 may be fulfilled by adjustments of the conditions of the pitch circle diameters, the numbers of thread starts, and the pitches of the main screw 1, the nut 2, and each roller 31.

Thus, in the planetary roller screw according to the present invention, by the provision that the helix direction (of the internal thread) of the nut is the same as the helix direction (of the second external thread) of each roller and opposite to the helix direction (of the first external thread) of the main screw, and with the rules of configuration (the ratio of the pitch circle diameters between the two followers and the ratio of the numbers of thread starts between the two followers are the same, and the number of thread starts of the nut is not equal to the sum of the number of thread starts of the main screw and twice the number of thread starts of each roller), when a specific driving member rotates, no relative displacement occurs between the two followers in the axial direction, making the two followers displaces stably and smoothly relative to the driving member in the axial direction, and increasing the corresponding displacement decelerated ratio, to thereby achieve more precise displacement control. Particularly, by the motion relationship between the driving member and the two followers of the planetary roller screw according to the present invention, the planetary roller screw according to the present invention may replace hydraulic cylinders and may be used in various tool machines, brake devices, humanoid robots, etc. requiring precise control of linear motion.

It should be particularly noted that, with the rules of configuration, especially based on the configurations having specific relationships between the pitch circle diameters and the numbers of thread starts of the main screw, the nut and each roller, the planetary roller screw of the present invention can still operate smoothly even when the toothed portion of the main screw, the toothed portion of the nut and the toothed portion of each roller are omitted. In other words, the planetary roller screw of the present invention can achieve the effect of smooth operation, even without the provision of any of the toothed portion of the main screw, the toothed portion of the nut and the toothed portion of each roller.

Although the present invention has been described with respect to the above preferred embodiments, these embodiments are not intended to restrict the present invention. Various changes and modifications on the above embodiments made by any person skilled in the art without departing from the spirit and scope of the present invention are still within the technical category protected by the present invention. Accordingly, the scope of the present invention shall include the literal meaning set forth in the appended claims and all changes which come within the range of equivalency of the claims. Furthermore, in a case that several of the above embodiments can be combined, the present invention includes the implementation of any combination.

What is claimed is:

1. A planetary roller screw comprising:

a main screw including an outer periphery having a first external thread extending along an axis of the main screw, wherein the axis of the main screw defines an axial direction;

a nut including a through-hole extending along the axial direction, wherein the nut includes an inner periphery surrounding the through-hole, wherein the inner periphery has an internal thread extending along the axial direction, wherein all or a portion of the first external thread of the main screw is located in the through-hole of the nut; and a planetary assembly including plural rollers each extending along another axis parallel to the axis of the main screw, each roller includes an outer periphery having a second external thread, wherein at least a portion of each roller is located in the through-hole of the nut, and wherein the second external thread of each roller meshes with the first external thread of the main screw and the internal thread of the nut, wherein a pitch of the first external thread of the main screw, a pitch of the internal thread of the nut, and a pitch of the second external thread of each roller are identical, wherein a helix direction of the first external thread of the main screw is opposite to a helix direction of the internal thread of the nut, and the helix direction of the internal thread of the nut is the same as a helix direction of the second external thread of each roller;

wherein one of the main screw and the nut is a driving member, and the other two of the main screw, the nut and the planetary assembly that are not the driving member are defined as two followers, wherein the planetary roller screw satisfies a rule of configuration, wherein when the driving member rotates, the driving member displaces relative to the two followers in the axial direction, and no relative displacement occurs between the two followers in the axial direction, and wherein the rule of configuration requires that a ratio of pitch circle diameters between the two followers and a ratio of numbers of thread starts between the two followers to be the same, and the number of thread starts of the nut to be not equal to a sum of the number of thread starts of the main screw and twice the number of thread starts of each roller.

2. The planetary roller screw as claimed in claim 1, wherein in the rule of configuration, the nut is the driving member, the ratio of the pitch circle diameter of the main screw to the pitch circle diameter of each roller is identical to the ratio of the number of thread starts of the main screw to the number of thread starts of each roller, and wherein when the driving member rotates, the planetary assembly displaces relative to the nut in the axial direction, and no relative displacement occurs between the main screw and the planetary assembly in the axial direction.

3. The planetary roller screw as claimed in claim 1, wherein in the rule of configuration, the main screw is the driving member, the ratio of the pitch circle diameter of the nut to the pitch circle diameter of each roller is identical to the ratio of the number of thread starts of the nut to the number of thread starts of each roller, and wherein when the driving member rotates, the planetary assembly displaces relative to the main screw in the axial direction, and no relative displacement occurs between the nut and the planetary assembly in the axial direction.

4. The planetary roller screw as claimed in claim 1, wherein the planetary assembly further includes an annular frame portion disposed between the main screw and the nut, wherein the annular frame portion includes plural receiving portions, wherein a number of the plural receiving portions is not smaller than a number of the plural rollers, and wherein each roller is received in a corresponding one of the plural receiving portions.

5. The planetary roller screw as claimed in claim 4, wherein the annular frame portion is an annular member, wherein the plural receiving portions form plural through-holes each extending in a radial direction of the annular frame portion, and wherein when each roller is received in the corresponding one of the plural receiving portions, each roller and the corresponding receiving portion have a gap therebetween in a circumferential direction of the annular frame portion about an axis of the annular frame portion.

6. The planetary roller screw as claimed in claim 1, wherein each of two ends of each roller in the axial direction includes a protruding portion, wherein the planetary assembly further includes an annular frame portion disposed between the main screw and the nut, wherein the annular frame portion includes two rings spaced from each other along the axial direction, wherein each of the two rings includes plural recessed portions spaced from each other in a circumferential direction about an axis of the annular frame portion, wherein the plural recessed portions of one of the two rings are aligned with the plural recessed portions of another of the two rings, and wherein each protruding portion of each roller is partially received in a respective one of the recessed portions.

7. The planetary roller screw as claimed in claim 6, wherein each protruding portion of each roller is provided with an elastic element, and wherein each elastic element is disposed between and abuts against a respective one of the annular frame portions and a respective roller.

8. The planetary roller screw as claimed in claim 1, wherein each of the first external thread of the main screw, the internal thread of the nut, and the second external thread of each roller includes an arcuate flank.

9. The planetary roller screw as claimed in claim 1, wherein the first external thread of the main screw further includes at least one toothed portion, wherein the second external thread of each roller of the planetary assembly includes at least one toothed portion, and wherein when screwed rotating occurs between the first external thread of the main screw and the second external thread of each roller, rotating in mesh is generated between the at least one toothed portion of the first external thread of the main screw and the at least one toothed portion of the second external thread of each roller.

10. The planetary roller screw as claimed in claim 1, wherein the internal thread of the nut includes at least one toothed portion, wherein the second external thread of each roller of the planetary assembly includes at least one toothed portion, and wherein when screwed rotating occurs between the internal thread of the nut and the second external thread of each roller, rotating in mesh is generated between the at least one toothed portion of the nut and the at least one toothed portion of the second external thread of each roller.

* * * * *